Dec. 30, 1941.    H. A. GEHRES    2,267,907
INTERNAL COMBUSTION ENGINE VALVE MECHANISM
Filed June 20, 1939    3 Sheets-Sheet 1
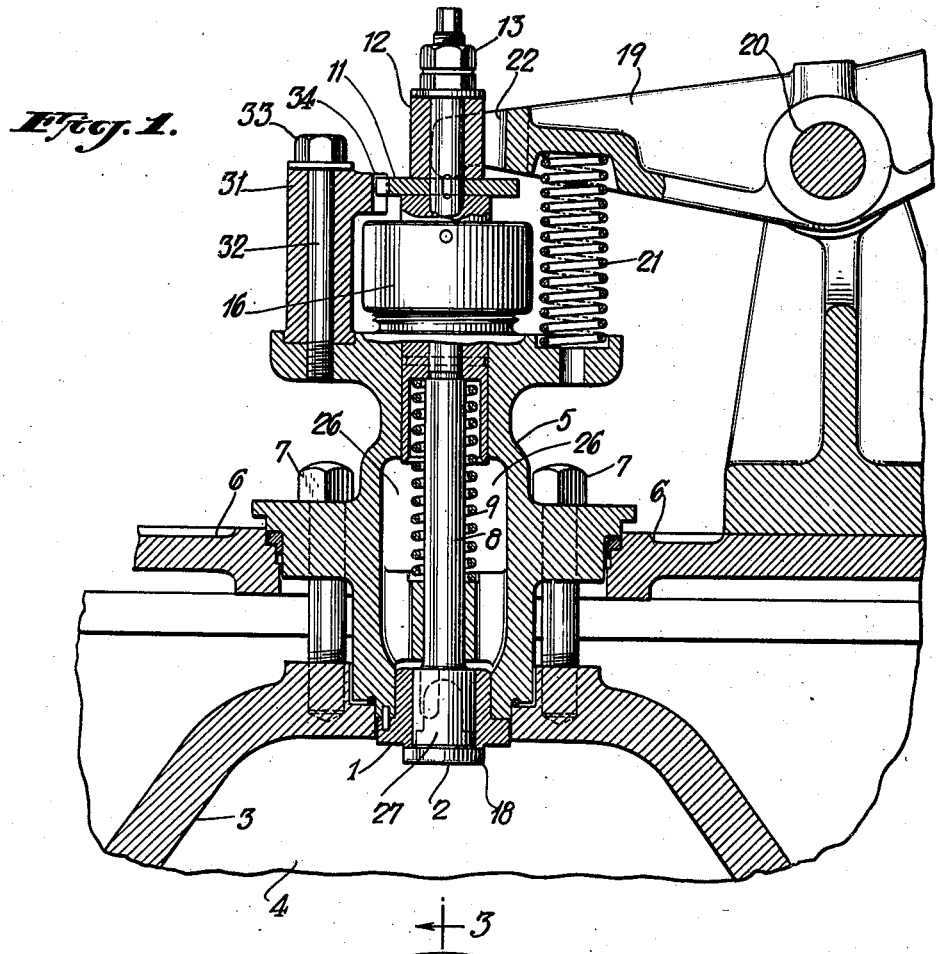
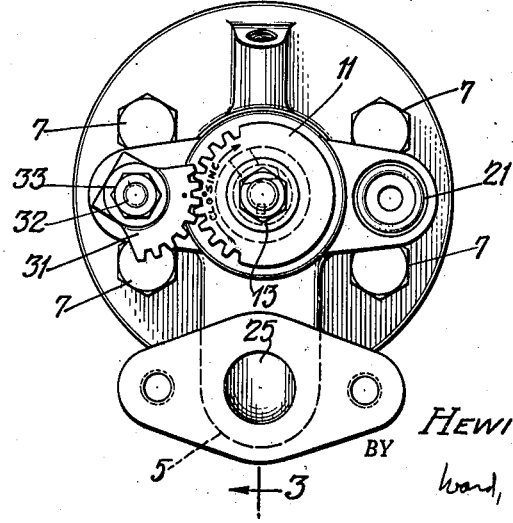
INVENTOR.
*Hewitt A. Gehres.*
BY
ATTORNEYS.

Dec. 30, 1941.  H. A. GEHRES  2,267,907
INTERNAL COMBUSTION ENGINE VALVE MECHANISM
Filed June 20, 1939  3 Sheets-Sheet 2
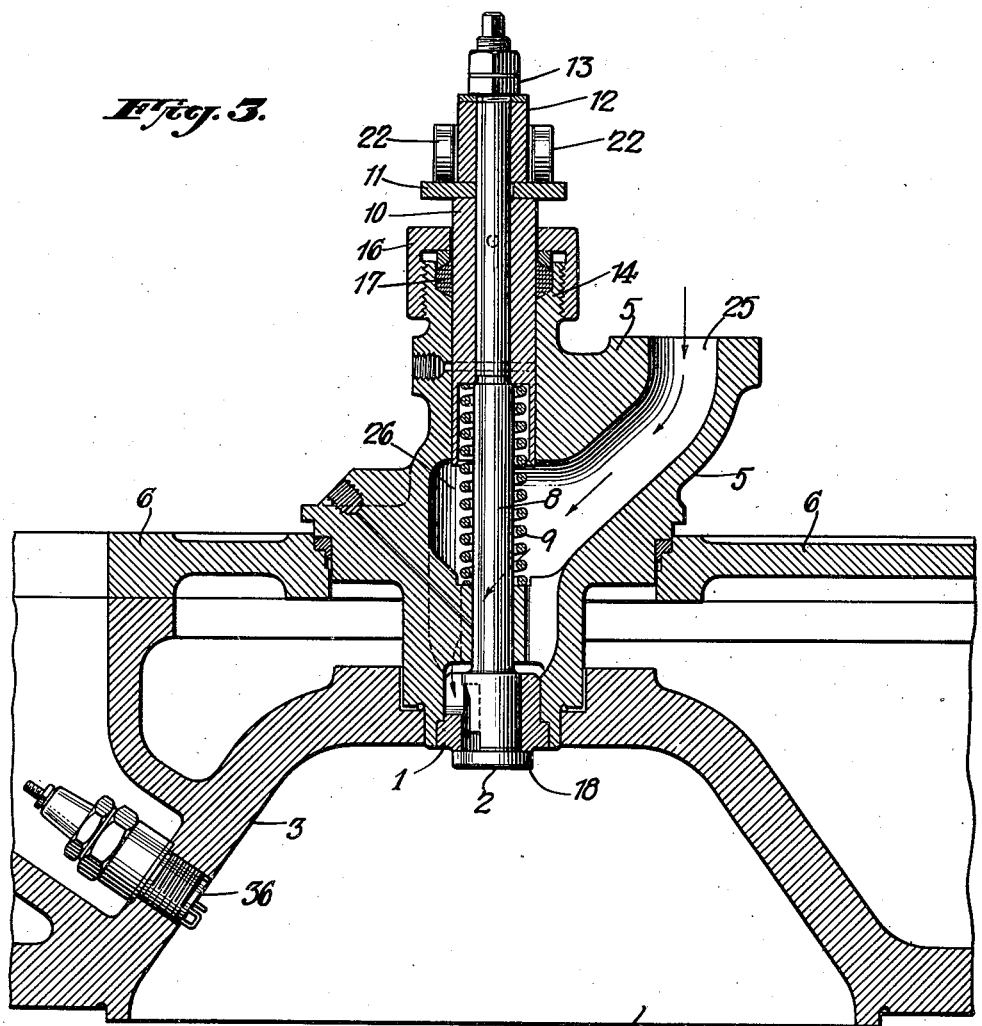
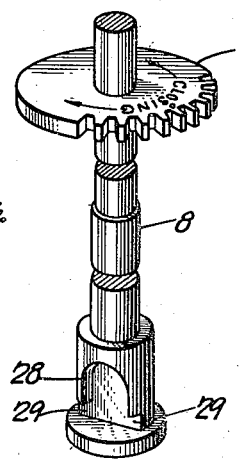
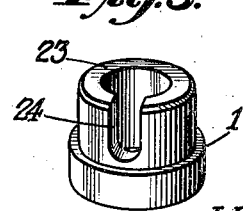
INVENTOR.
Hewitt A. Gehres.
BY
ATTORNEYS.

Dec. 30, 1941.  H. A. GEHRES  2,267,907
INTERNAL COMBUSTION ENGINE VALVE MECHANISM
Filed June 20, 1939  3 Sheets-Sheet 3
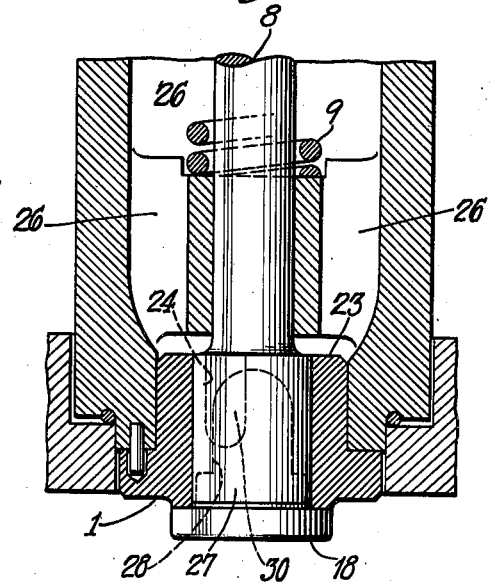
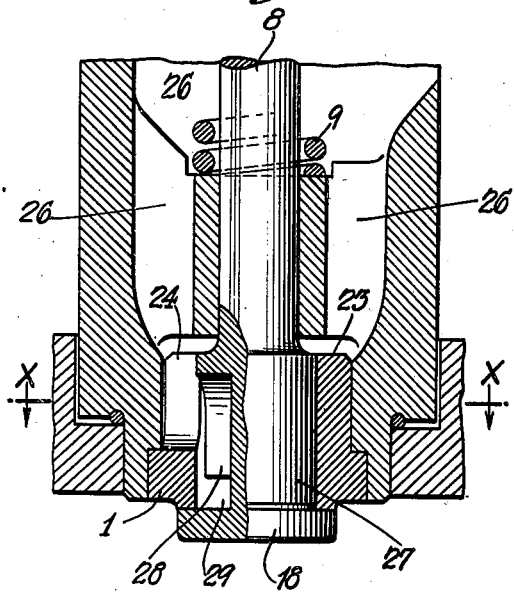
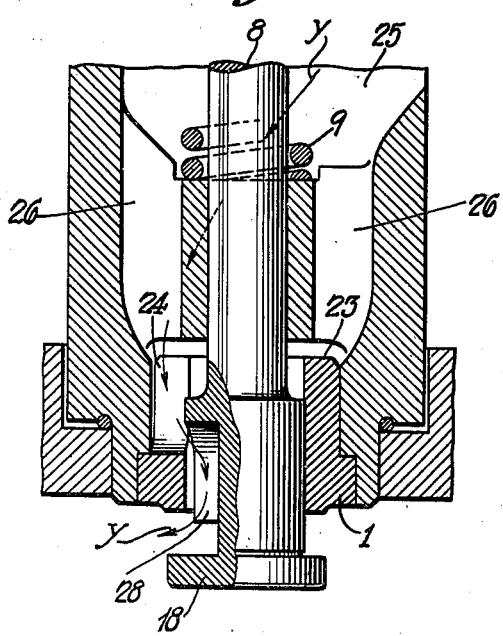
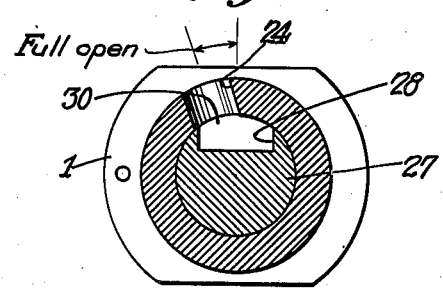
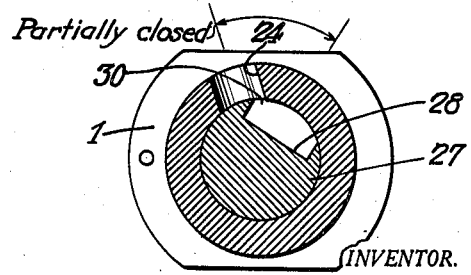
INVENTOR.
HEWITT A. GEHRES.
BY
ATTORNEYS Patented Dec. 30, 1941

2,267,907

UNITED STATES PATENT OFFICE 2,267,907

INTERNAL COMBUSTION ENGINE VALVE MECHANISM

Hewitt A. Gehres, Mount Vernon, Ohio, assignor to Cooper-Bessemer Corporation, Mount Vernon, Ohio, a corporation of Ohio Application June 20, 1939, Serial No. 280,021

5 Claims. (Cl. 251—34)

This invention pertains to fuel injection systems for internal combustion engines, especially of the two-cycle type including Diesel engines, and its principal object is to provide an intake valve mechanism which may be quickly and easily adjusted to regulate, in accordance with the fuel employed, the fuel supplied therefrom to a combustion chamber or cylinder.

A problem is presented in effectively regulating the fuel supplied to the combustion chamber or cylinder of such engines, due to the marked variations in the heat values of the fuels that may be employed. For example, one fuel may have a heat value of 1000 B. t. u.'s per as compared to a heat value of 1800 B. t. u.'s for another supply. In the past, it has been attempted to care for such differences with the plain poppet type of valve, by changing the adjustment under the rocker arm to give the valve a greater or lesser lift, depending on the fuel employed. Varying the clearance under the tappet in this way has, however, the disadvantage that it results in noisy operation. Another disadvantage is that with any given size of poppet valve, the fuel pressure cannot be varied over more than an extremely narrow range without getting beyond the practical capacity of the valve. That is to say, if the valve is designed for fuel of say 1800 B. t. u. heat value, and the attempt is made to employ fuel of say 1000 B. t. u. rating, adjustment of the valve lift to the maximum extent practicable does not suffice, so that it becomes necessary for the governor to reduce the pressure of the fuel supply to such an extent that the fuel is not projected sufficiently far into the combustion chamber to give a good mixture, or to reach the spark plug, particularly at light loads, thereby producing intermittent firing. Maintenance of the requisite fuel pressure would require poppet valves of different sizes for fuels of different heat ratings, which of course, is impractical.

In order to eliminate the above noted and other defects and disadvantages of existing devices, the present invention provides a valve mechanism of special construction, consisting in its essentials in providing the cylinder combustion chamber, in each instance, with an annular valve seat having a fuel injection port in its annular wall external to the combustion chamber, and a valve having a flanged end engaging the seat when closed and having an enlarged head, between the stem and flanged end containing a recess or cavity exposed to the port for conveying fuel therefrom into the combustion chamber during unseating of the valve. Means are provided for adjustably rotating the valve and for locking it in a desired rotative position thereby to vary the aperture between the valve seat port and the valve cavity, thus regulating in accordance with fuel requirements the effective valve aperture for injection of fuel into the combustion chamber.

It will be observed that with this arrangement no variations in valve diameter or lift are required. The valve rockers and tappets may accordingly be adjusted for minimum clearance and quiet operation. The valve adjustment permits of gradual and continuous variation of the fuel injection aperture to handle wide variations in fuel heating values with no structural changes in the valve.

Since, in accordance with the invention, the valve cavity, due to its shape, produces a directional flow of the injected fuel into the combustion chamber, advantage of this effect may be taken in accordance with a further aspect of the invention, by positioning the spark plug adjacent to and in the path of the injected fuel flow. In this way, a richer mixture is provided in the region of the spark plug than otherwise, which is particularly advantageous at light loads since it assures regular firing and better operation, in contrast to the irregular and intermittent operation of existing types of two cycle motors.

Referring now to the drawings:

Fig. 1 is a sectional view in elevation of a valve assembly in accordance with the invention as incorporated in an internal combustion engine, the section being taken axially along the valve and in a plane perpendicular to the rocker arm shaft;

Fig. 2 is a plan view of the valve structure showing the mechanism for rotating and locking the valve stem in a desired rotative position;

Fig. 3 is a section at 3—3 of Fig. 2;

Fig. 4 is a perspective view of the valve element proper showing in detail the shape and arrangement of the recess or cavity in the head thereof in relation to the flange, and also showing a gear element comprising a portion of the mechanism for rotating and locking the va've in a desired rotative position;

Fig. 5 is a perspective view of the valve seat showing the shape and positioning of the valve port in its annular wall;

Figs. 6, 7 and 8 are enlarged sectional views of the valve seat and valve head assembly; Fig. 6 corresponding to the showing in Fig. 1; Fig. 7 being a similar showing with the section taken through the valve seat port and valve cavity with the valve closed; and Fig. 8 a view similar to Fig. 7 but showing the valve open to permit injection of fuel into the cylinder; and Figs. 9 and 10 are sectional views at x—x of Fig. 7 showing respectively, the valve rotated to the "full open" position with respect to the valve seat port, and the valve rotated to a "partially closed" position.

Referring to the drawings wherein like elements are similarly designated, the assemblage of Figs. 1 and 3 comprises, an annular valve seat 1 seating a valve 2 within an aperture in the cylinder head 3 of a combustion chamber 4, the valve seat being housed within a bore of a supporting member 5 carried by a frame member 6 and secured to the cylinder head by bolts 7 threaded into the head 3 as shown. The stem 8 of valve 2 extends upwardly through a helical compression spring 9, a sleeve 10, a gear member 11 splined to the valve stem, a second sleeve 12, a nut 13 being threaded onto the tappet end of the valve stem, for maintaining the assembly as shown. Sleeve 10 extends through and slidingly engages a bore of the supporting member 5 onto an upper extension 14 of which is threaded a bushing 16 for maintaining a packing 17 about sleeve 10. Spring 9 compressed between sleeve 10 and an abutment on the supporting member 5 as shown, maintains the flanged end 18 of the valve, normally seated against the lower face of the valve seat as shown.

The valve is actuated in a known manner by a rocker arm 19 pivoting on a shaft 20 and normally maintained in the position shown by a compression spring 21 disposed between the rocker arm and extension lug of supporting member 5, the opposite end of the rocker arm being elevatable in a known manner by motor driven means (not shown), to unseat valve 2 by depression of the extension lugs 22 on the rocker arm 19, against gear element 11 affixed to the valve stem.

The assemblage as described thus far is of a more or less conventional design, construction and operating except for the valve and valve seat. Referring now more in detail to the novel aspects of the invention, the valve seat is provided at the upper edge of its annular wall 23, with a port 24 external to the combustion chamber and of substantially U-shaped contour, Fig. 5. A fuel injection chamber 25 provided in supporting member 5, extends to the valve seat port 24 through passageways 26 extending around the valve stem 8 as shown.

The valve 2 is provided just above its flanged end 18, with an enlarged head 27 slidably engaging the annular wall of the aperture of the valve seat, and into one side of which head is milled a recess or cavity 28 of substantially inverted U-shaped contour viewed in front elevation, Figs. 4 and 6, and of substantially rectangular contour in cross-section, Fig. 9, the side walls of the recess being cut away just above the flange 18 as shown at 29, Figs. 4 and 7.

As shown more particularly in Figs. 6 to 10, inclusive, the valve cavity 28 is of such height and the valve stem disposed in such rotative position relative to the seat, as to expose the valve cavity in greater or lesser degree to the valve seat port 24, whereby the fuel supply from chamber 25 has access to the cavity through the port. So long, however, as the valve is seated, the fuel is prevented from entering the combustion chamber, due to engagement of the flanged end 18 of the valve with the lower face of the valve seat, as shown in Fig. 7. When, however, the valve is unseated in the manner above described and as is illustrated in Fig. 8, fuel is injected, as shown by the arrows YY, down through the passages 26 of chamber 25, through the valve seat port 24 into the valve cavity 28, and thence out into the combustion chamber in the space now provided between the flanged end 18 of the valve and the lower face of the valve seat.

The port in the valve seat and the valve recess are, as stated, exposed to one another over an aperture 30, Figs. 6, 9, and 10, which varies with the rotative position of the valve in relation to the valve seat, whereby a means is provided in the valve for regulating the flow of fuel into the combustion chamber. For purposes of adjusting the valve to a desired rotative position and locking it in the position desired, the gear member 11 secured to the valve stem as above described, meshes with a gear sector 31, Figs. 1 and 2, mounted on a bolt 32 threaded into the supporting member 5. Upon loosening the bolt by means of its nut-like bolt head 33, the valve may be rotated to the position desired by merely tapping sector 31, and the valve then locked in this position by tightening up on the bolt head with a wrench. It will be observed that the gear sector 31 is provided with teeth 34, Fig. 1, of sufficient thickness to remain in mesh with the teeth on gear element 11 carried by the valve stem, during unseating as well as seating of the valve, so that the teeth of element 11 slidably engage the teeth of sector 31 during operation of the motor.

Since the port 28 is milled in but one side of the valve head, it provides a directional flow of the injected fuel into the combustion chamber as shown by the arrows YY in Fig. 8. Therefore, by locating the combustion chamber spark plug 36, Fig. 3, in the cylinder head 3, close to the valve and in the path of the injected fuel as shown, a richer fuel mixture will be provided in the vicinity of the spark plug than otherwise, thus assuring regular firing and better operation of the motor, especially at the light loads productive of misfiring with existing types of two-cycle engines.

What is claimed is:

1. A valve mechanism for internal combustion engines comprising in combination: an annular valve seat having a fuel intake port in its annular wall, and a valve having a stem adapted to slidably engage the annular wall of said seat and a flanged end adapted to seat thereon, said stem containing a cavity in one side thereof for conveying fuel from said port past said flanged end when unseated, said valve being rotatable in said seat for varying the fuel intake aperture between said port and said cavity.

2. A valve mechanism for internal combustion engines comprising in combination: an annular valve seat having a fuel intake port in its annular wall, and a valve comprising a stem terminating in an enlarged head portion adapted to slidably engage the annular wall of said valve seat and a flanged end adapted to seat thereon, said head portion containing a cavity in one side thereof for conveying fuel from said port past said flanged end when unseated, said valve being rotatable in said seat for varying the fuel intake aperture between said port and said cavity.

3. An annular valve seat for internal combustion engines having a substantially U shaped fuel intake port in the upper edge of its annular wall, and a flanged lower edge, the upper surface of which is adapted to seat on a support and the lower surface of which is adapted to seat a valve thereon.

4. A valve for internal combustion engines comprising a cylindrical stem terminating in an enlarged cylindrical head and a flanged end adapted to engage a valve seat, said head containing a recess in one side thereof adjacent said flange and of substantially inverted U shaped contour.

5. A valve mechanism for internal combustion engines, comprising in combination: an annular valve seat having a substantially U shaped fuel intake port in the upper edge of its annular wall, and a valve comprising a stem terminating in an enlarged head adapted to slidably engage the annular wall of said seat and having a flanged end adapted to seat on the lower edge of said valve seat, said head containing a recess of substantially inverted U shaped contour adapted to cooperate with said port for conveying fuel from said port past said flange when the valve is unseated, said valve being rotatable in said seat for varying the fuel intake aperture between said port and said recess.

HEWITT A. GEHRES.